United States Patent [19]
Reynolds

[11] Patent Number: 6,101,280
[45] Date of Patent: *Aug. 8, 2000

[54] METHOD AND APPARATUS FOR COMPRESSION OF ELECTRONIC INK

[75] Inventor: David Everett Reynolds, Thornbury, United Kingdom

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/778,553

[22] Filed: Jan. 3, 1997

Related U.S. Application Data

[63] Continuation-in-part of application No. 08/484,148, Jun. 7, 1995, abandoned.

[30] Foreign Application Priority Data

Jul. 4, 1994 [EP] European Pat. Off. .............. 94304890

[51] Int. Cl.[7] .............................. G06K 9/36; G06K 9/00; G06K 9/18

[52] U.S. Cl. ......................... 382/241; 382/119; 382/186; 382/187

[58] Field of Search ...................... 382/122, 120, 382/186, 187, 188, 241, 311, 119, 189, 199, 243, 185, 177, 203, 202, 123; 395/142

[56] References Cited

U.S. PATENT DOCUMENTS

| | | | |
|---|---|---|---|
| 4,020,463 | 4/1977 | Himmel | 382/242 |
| 4,542,412 | 9/1985 | Fuse et al. | 358/433 |
| 4,653,107 | 3/1987 | Shojima et al. | 382/189 |
| 4,718,103 | 1/1988 | Shojima et al. | 382/189 |
| 4,771,474 | 9/1988 | Takashima et al. | 382/241 |
| 4,969,201 | 11/1990 | Takasaki et al. | 382/199 |
| 5,392,363 | 2/1995 | Fujisaki et al. | 382/187 |
| 5,467,407 | 11/1995 | Guberman et al. | 382/186 |
| 5,473,742 | 12/1995 | Polyakov et al. | 395/142 |
| 5,623,555 | 4/1997 | Nelson et al. | 382/141 |

FOREIGN PATENT DOCUMENTS

| | | | |
|---|---|---|---|
| 0 447 176 A2 | 9/1991 | European Pat. Off. | G06F 15/72 |
| 0 678 833 A2 | 10/1995 | European Pat. Off. | G06T 9/00 |
| 0678 833 A2 | 10/1995 | European Pat. Off. | G06T 9/00 |
| 195 31 392 | 1/1997 | Germany | G06K 9/48 |
| WO 94/03853 | 2/1994 | WIPO | G06F 3/14 |

OTHER PUBLICATIONS

"The State of the Art in On–Line Handwriting Recognition" C. C. Tappert et al., IEEE Transactions on Pattern Analysis and Machine Intelligence, vol. 12, No. 8 (1990).

Daniel P. Lopresti & Andrew Tomkins. "Pictographic naming." Technical Report 007–mei–pti–mitl–228–1, Matsushita Information Technology Laboratory, Princeton, Nov., 1992.

Daniel P. Lopresti & Andrew Tomkins. "A comparison of techniques for graphical database queries." Technical Report MITL–TR–45–93,Matsushita Information Technology Laboratory,Princeton, May, 1993.

Thierry Paquet & Yves Lecourtier. "Recognition of handwritten sentences using a restricted lexicon." Pattern Recognition. 26(3):391–407, 1993.

Pattern Recognition vol. 26, No. 3, 1993, pp. 451–460, XP367317 P. Morasso et al.

(List continued on next page.)

Primary Examiner—Thomas D. Lee
Assistant Examiner—Wenpeng Chen
Attorney, Agent, or Firm—Ladas & Parry

[57] ABSTRACT

There is provided a lossy ink compression system aimed at low cost, high compression of ink on hand-held platforms. The present invention detects the critical cusp, or knot points in the ink and then resamples the smooth curves between successive cusp points discarding the dynamic information. The resampled data is then scaled to more closely match the display resolution. Finally, the data is delta coded and then packed for storage.

21 Claims, 9 Drawing Sheets

OTHER PUBLICATIONS

'Recognition experiments of cursive dynamic handwriting self–organizing networks', Section "2. Preprocessing" *figure 1*.

Int Neural Network Conf., vol. 1, Jul. 9, 1990, Paris FR—pp. 141–144, XP145254.

P Morasso et al 'Self–organization of an allograph lexicon' Section "1, Introduction", Section "2.1 Segmentation module".

Information Theory, Aug. 29, 1960, London GB pp. 300–316, LS Frishkopf et al. 'Machine reading of cursive script' *p. 301, line 27–line 29*.

Pattern Recognition, vol. 26, No. 3, 1993–pp. 391–407, XP367312 T Paquet et al. 'Recognition of handwritten sentences using a restricted lexicon', p. 401 Section "4.3.2 Normalizing the editing costs".

1990 IEE Int. Conf. on Systems, Man and Cybernetics, Nov. 4, 1990 Los Angeles, Ca, pp. 835–838, XP215462 DW Fincher et al Multi–sensor data fusion using neural networks *p. 836, left column, line 55;fi.

METHOD AND APPARATUS FOR COMPRESSION OF ELECTRONIC INK

CROSS REFERENCE TO RELATED APPLICATION

This application is a Continuation-in-Part of U.S. patent application Ser. No. 08/484,148, filed Jun. 7, 1995, now abandoned, incorporated by reference herein.

TECHNICAL FIELD

The present invention relates to a data compression system, and more specifically, to the compression of electronic ink data.

BACKGROUND OF THE INVENTION

Several products support the capture and storage of handwritten information in the form of electronic ink. As used herein, electronic ink is a sequence of inked strokes, each stroke being a sequence of (x,y) coordinate pairs measured by a digitizer tablet at a constant sample rate. Numerous digitizing devices are known in the art. One such device, for example, has a sample rate of 100 Hz, the coordinate pairs are given in units of milli-inches and are represented by 16 bit integers. For this exemplary device, raw representation required roughly 1 kB to store a typical handwritten word.

For hand-held products the limitations on memory size require some data compression of the electronic ink to allow storage of a useful volume of notes and sketches. Data compression systems are known in the prior art that encode digital data into compressed digital code and decode the compressed digital code back into the original digital data. Data compression refers to any process that attempts to convert data in a given format into an alternative format requiring less space than the original. The objective of data compression systems is to effect a saving in the amount of storage required to hold or the amount of time required to transmit a given body of digital information. Data compression systems can be divided into two major categories; loss-less and lossy.

To be of practical utility, a data compression system should satisfy certain criteria. The loss-less system should have reciprocity. In order for a loss-less data compression system to possess the property of reciprocity it must be possible to reexpand or decode the compressed data back into its original form without any alteration or loss of information. The decoded and original data must be identical and indistinguishable with respect to each other. A lossy data compression system may allow some alteration or loss of information during the compression de-compression process provided the overall perception of the data is unchanged.

Loss-less compression of electronic ink is certainly possible. However, from the point of view of ink which is only required to be rendered to a screen there is significant redundant information in the ink which can be discarded. Given the requirement for high compression ratios a lossy compression technique is most suitable.

The data compression systems should provide sufficient performance with respect to the data rates provided by and accepted by the devices with which the data compression and de-compression systems are communicating. Performance of electronic ink application is of great importance because generally, the electronic application is used on small computers with relatively modest CPU power. Even systems of greater computing power might be significantly slowed if a complex compression technique must be applied to each stroke.

Another important criterion in the design of data compression and de-compression systems is compression effectiveness, which is typically characterized by the compression ratio. The compression ratio is generally defined as the ratio of data size in uncompressed for divided by the size in compressed form. In order for data to be compressible, the data must contain redundancy. Compression effectiveness is determined by how effectively the compression procedure uses the redundancy in the input data.

An electronic ink application must balance compression effectiveness against performance and ink degradation. Relatively high compression ratios are possible because the electronic ink has several sources of redundancy that allow for compression.

Published International Patent Application WO 94/03853 discloses a method and apparatus for the compression of electronic ink in which extrema points are saved to preserve fidelity. To reduce the number of points stored between successive extrema, each point is tested for local curvature and points with low curvature are discarded. This local test risks distorting ink which turns smoothly over an extended stroke, in which case there may be no point which triggers the curvature test but the cumulative curvature is enough to introduce kinks.

In the exemplary device, the constant sampling frequency (100 Hz) allows the capture of dynamic information on the pen movements. However, the sampling frequency is well above the Nyquist limit for handwriting and the data could be down-sampled by a factor of 2–4 and still retain the full dynamic information. The dynamic information is very important for signature verification and is useful in some approaches to handwriting recognition and scribble matching. However, the dynamic information is unnecessary for the purposes of rendering the ink trace onto a display device.

The use of absolute coordinate positions in the default ink representation allows the pen position to vary by the complete range between successive 10 ms samples. This is about two orders of magnitude higher than the maximum slew rate the human hand achieves. In normal handwriting the velocity peaks are another order of magnitude lower (2–5 in/s). Furthermore, the pen trajectory between velocity minima is a smooth, slowly varying curve and so the location of the next sample point is reasonably predictable using linear prediction, curve fitting or a dynamic model. Thus, a coding of the model together with the deviations from that model can offer further compression, though in practice knot points occur with sufficient density (thus resetting the models) that the saving is modest.

Both the digitizer and display resolutions are significantly below the standardized milli-inch resolution of the internal pen data. Reducing the stored resolution to match a known specific digitizer/display setup or to simply use a lower standardized resolution (e.g. 300 dpi) offers some small additional saving.

SUMMARY OF THE INVENTION

To accomplish the present invention there is provided a method for reducing the size of a digital representation of handwriting. Firth, the digital representation is passed through a low pass filter. Next, the local extrema points, a superset of the knot points, are located. The knot point detection may generate artifacts, which are removed. Next, the original data is resampled by polygonal approximation to create resampled data by selectively replacing the curved lines with straight lines. The resampled data is rescaled to create rescaled data. Rescalling scales the data to better match the destination resolution. Next, the rescaled data is encoded using a delta encoding technique and packed before storage.

Polygonal approximation is used to resample the original data. Polygonal approximation is accomplished by first defining a straight line from a first knot point to a second knot point. A point, along the portion of the digital representation between the first knot point and the second knot point, that is a maximum distance from the straight line is found. If the maximum distance is greater than a limit value then the straight line is replaced with a straight line form the first knot point and the point and another straight line from the point and the second knot point. If the maximum distance is less than the limit value then the length of the straight line is tested. If the straight line is shorter than a maximum length then the portion of the digital representation between the first knot point and the second knot point is replaced with the straight line. Alternatively, if the straight line is longer than the maximum length, then the straight line is divided at a dividing point, where the dividing point is located on the portion of the digital representation between the first knot point and the second knot point. This process is recursively executed until the digital representation is replaced by a series of straight lines that are shorter than a maximum length and do not deviate from the digital representation by more than a limit value.

Decompression requires the decoding of the delta encoded data. Straight lines may then be used to render the decoded data. However, during the decompression process, an optional smoothing process may be enabled. This smoothing method is accomplished by first identifying cusps in the rescaled data, where a cusp occurs at points of high curvature. Using a second-order spline polynomial, at least one interpolation point between each pair of points along the decoded data between the cusps is generated.

BRIEF DESCRIPTION OF THE DRAWINGS

A better understanding of the invention may be had, by way of example, from consideration of the following detailed description taken in conjunction with the accompanying drawings in which.

DETAILED DESCRIPTION OF THE PREFERRED EMBODIMENTS

Figure 1:
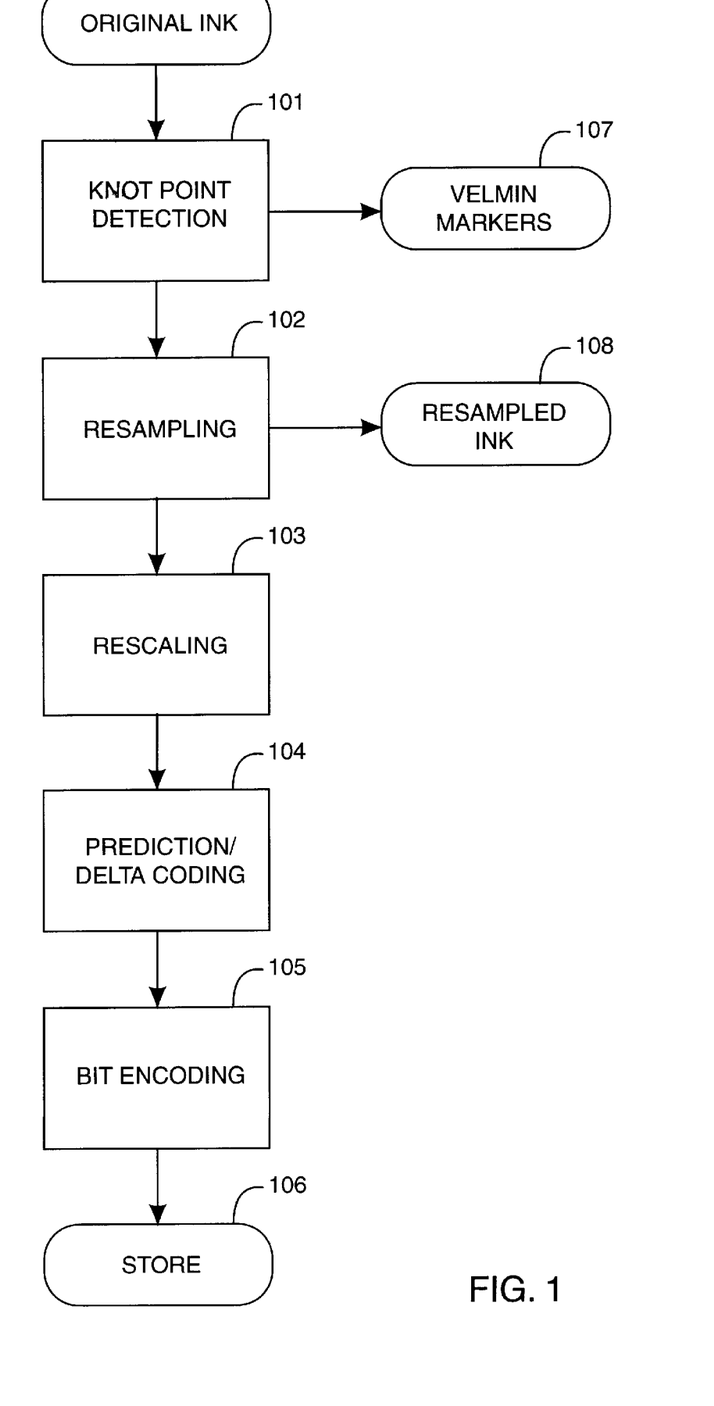
FIG. 1 is a high level flow chart showing the logical operation of the compression part of the preferred embodiment of the present invention.

Referring now to FIG. 1, where a flow diagram of the preferred embodiment of the present invention is shown. The present invention detects 101 the knot points in the ink and then resamples 102 the smooth curves between successive knot points discarding the dynamic information. The resampled data is then scaled 103 to more closely match the display resolution. Next, the data is delta coded 104 and then packed 105.

First, lets briefly look at the function of each block. The first stage, knot point detection 101, detects the points of high curvature in the ink. Knot point detection 101 can optionally detect velocity minima points, which can also be stored 107 as separate markers on the compressed ink if desired. Additional discussion about these velmin markers will not be given here since they are not used in the rest of the compression pipeline and there are several alternative methods for attached this additional information to the ink stream.

The second stage, resampling 102, generates a new smaller set of ink samples while preserving the knot points detected in 101. These samples can be encoded in the same form as the original ink resulting in a reduced size ink record which requires no decompression 108. Depending on the writing style and on the aggressiveness of the resampling step the resampled ink can be between 20% and 45% of the size of the original ink sample without serious loss of legibility.

Next, to achieve high compression ratios, the ink format is changed by further quantizing the resolution of sample coordinates 103, termed 'rescaling'. Due to the nature of the ink, replacing the absolute coordinates by delta coordinates 104 can reduce the amount of data. Finally, in block 105 the resulting small delta values are encoded in a compact bit stream.

One skilled in the art will understand that for each of the processing blocks there are several alternative algorithms and parameter settings which give different speed, compression and fidelity trade-offs.

With that brief overview, a more detailed description for each block will follow.

Handwriting contains regions of high curvature (knot points comprising cusps and small loops) which are critical for legibility. Simply resampling the ink without regard to these critical regions results in distortion and loss of legibility. To avoid this, the critical points (hereafter referred to as knot points) are detected first. The knot point detection step 101 has several benefits:

1. Knot points are preserved in the final coded ink, leading to better legibility;
2. The ink traces between knot points are simple, smooth curves thus simplifying the resampling process; and
3. Compression and other pre-processing (if used) can share knot detection, reducing the combined processing time and ensuring that the compressed ink has the velmin (velocity minima) markers needed for some type of handwriting recognition.

The choice of feature detection algorithm used to mark these knot points depends on the overall system requirements. If some kind of handwriting analysis capability is required then a known velocity minima detection algorithm should be used. The velmin markers can be used both as the input to the resampling step and stored separately for use in matching. However, if one is only interested in compression and very low compute cost is required then simpler algorithms are possible. In particular, x/y extrema are cheaper to compute and are typically a superset of the velmin points. Detecting extra knot points beyond cusps and sharp loops is not a problem. At worst these additional knot points might result in slightly lower compression by over-constraining the resampling step, however in practice this effect was found to be negligible.

Figure 2:
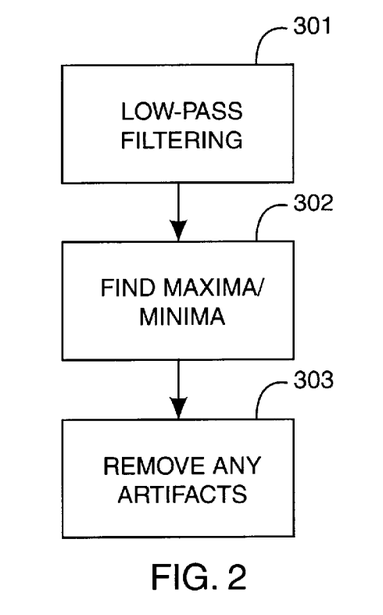
FIG. 2 is a high level flow chart showing the logical operation of knot point detection.

Referring now to FIG. 2, in the preferred embodiment, the extrema-based knot detector cannot simply look for local maxima/minima in raw x/y values because the combination of motor tremor and digitization noise generates numerous spurious local extrema. To overcome this, raw data is first low pass filtered 301 to reduce the noise and then tested for extrema 302 across a fixed width window, rather than simply neighbouring data points. Finally, the marked extrema are posit processed to remove some artifacts 303.

Low pass filter 301 is accomplished by a moving average filter given in eq. 1

$$X'_i = \sum_{j=-R}^{R} X_{(i+j)} \qquad \text{eq. (1)}$$

R was chosen to equal 2 for data sampled at 100 Hz sampling. It should be pointed out that the filtered data is used for determining the knot and resample points only. The original data is used to supply the actual coordinates values of the resampled ink. Thus, the precise response of the low pass filter is not critical and the simple moving average is sufficient.

Figure 3:
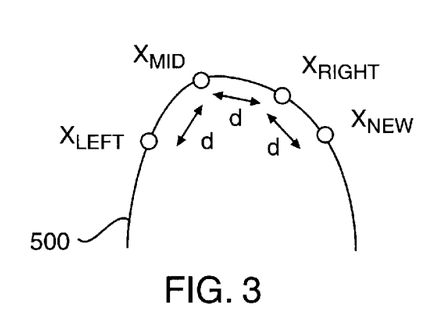
FIG. 3 shows an example of the window based extrema detection in accordance with the present invention.

Referring now to FIG. 3, the maxima/minima (also referred to as extreme) of line 500 are detected by moving a three point test window along the filtered data, recording any extrema found. An extremum is found within the test window if the x (or y) coordinate of $x_{mid}$ is greater than (or less than) the corresponding coordinates of both $x_{left}$ and $x_{right}$. The actual location of the extremum is then found by selecting the single data point within the $x_{left}$ to $x_{right}$ window which has the greatest (or least) x (or y) value.

After each test the window is shifted using:

$$\underline{x}_{mid-} \rightarrow \underline{x}'_{left}$$

$$\underline{x}_{right} \rightarrow \underline{x}'_{mid}$$

$$\underline{x}_{new-} \rightarrow \underline{x}'_{right}$$

To increase processing speed, the spacing distance d is calculated using the city block distance (sum of x and y displacements) rather than Euclidean distance.

Figure 4:
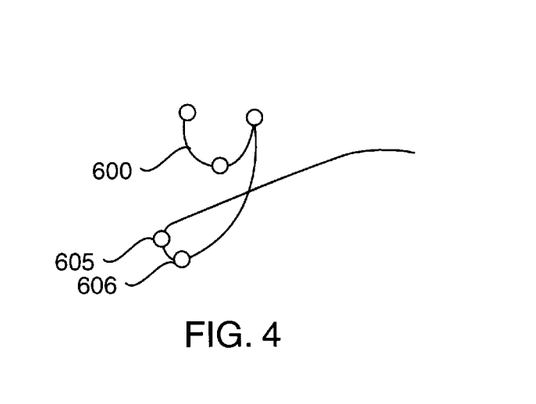
FIG. 4 illustrates a typical handwritten letter than may have close x/y extrema points.

This simple maxima/minima detector generates a particular class of artifacts which are worth removing. On sloped handwriting 600, many loops have both an x 605 and y 606 extremum in close proximity as shown in FIG. 4. To reduce the effect, only the sharper of the pair of candidate knot points which are closer than some threshold (two sample points in the preferred embodiment) are retained.

The knot points detected in 101 of FIG. 1 split each stroke of the ink into a series of smooth curve segments. The resampling step is applied to each segment in turn attempting to replace the original time-based ink samples by a set of spatially separated samples which are sufficiently dense to define the ink trajectory. This reduces the number of sample points since the original ink data includes periods when the pen is moving slowly, generating many closely spaced samples.

The resampling technique used is that of polygonal approximation. The present segment is replaced by a series of straight-line segments in which the maximum distance between each original sample point and the nearest line segment is less than some small threshold ($\tau$). In the preferred embodiment, thresholds in the range 2–8 milli-inches, which are below the typical pixel spacing for the target LCD displays, are used.

The polygonalisation algorithm used, which is described in greater detail below, differs from traditional methods in two ways. Firstly, the deviation test is only applied locally rather than globally, for speed. Secondly, the length (d) of the line segments that are generated is limited to a maximum. This guaranteed upper bound on segment length simplifies the later coding stage and improves the robustness against errors in the local-deviation test.

Figure 5:
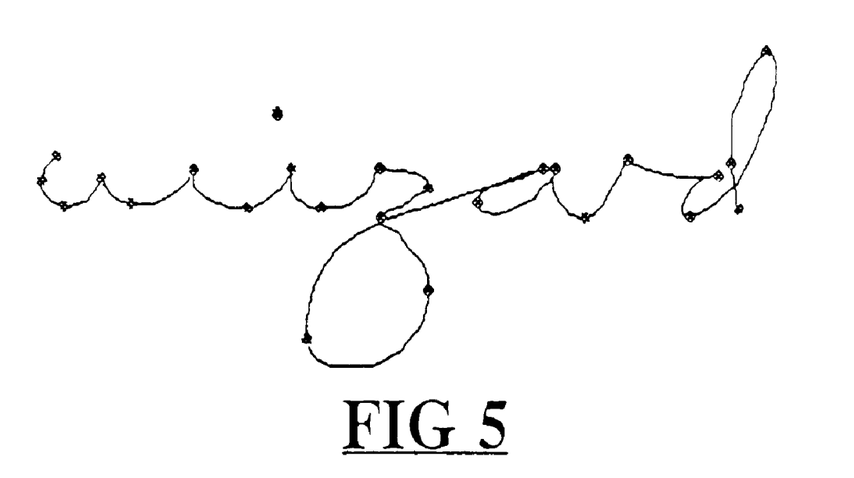
FIG. 5 shows the knot points detected in a sample handwritten word.
Figure 6A:
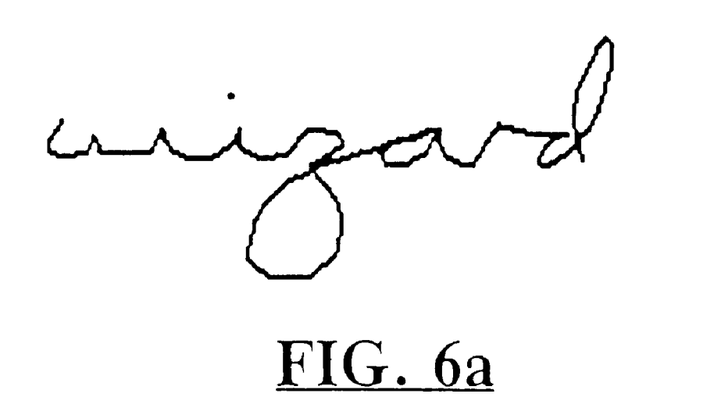
FIG. 6a illustrates the effects of polygonal sampling of the handwritten word of FIG. 5, where $\tau=2$ and $d=56$ milli-inches.
Figure 6B:
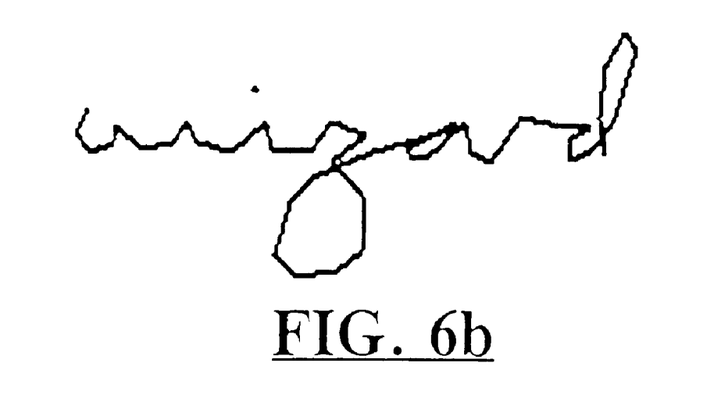
FIG. 6b illustrates the effects of polygonal sampling of the handwritten word of FIG. 5, where $\tau=5$ and $d=112$ milli-inches.

The result of resampling the ink from FIG. 5 is shown in FIG. 6. For this example the resampled ink requires 33% of the data points of the original ink at the fine setting (FIG. 6a) and 22% at the coarse setting (FIG. 6b).

Figure 7A:
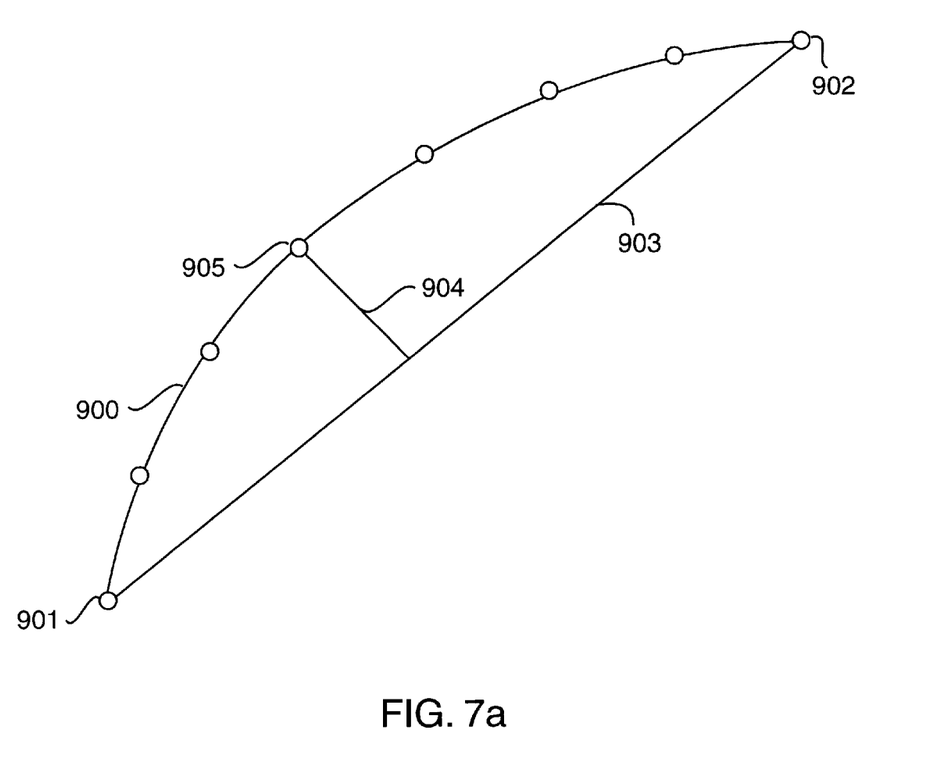
FIG. 7a shows the first iteration of polygonal sampling on a line segment.
Figure 7B:
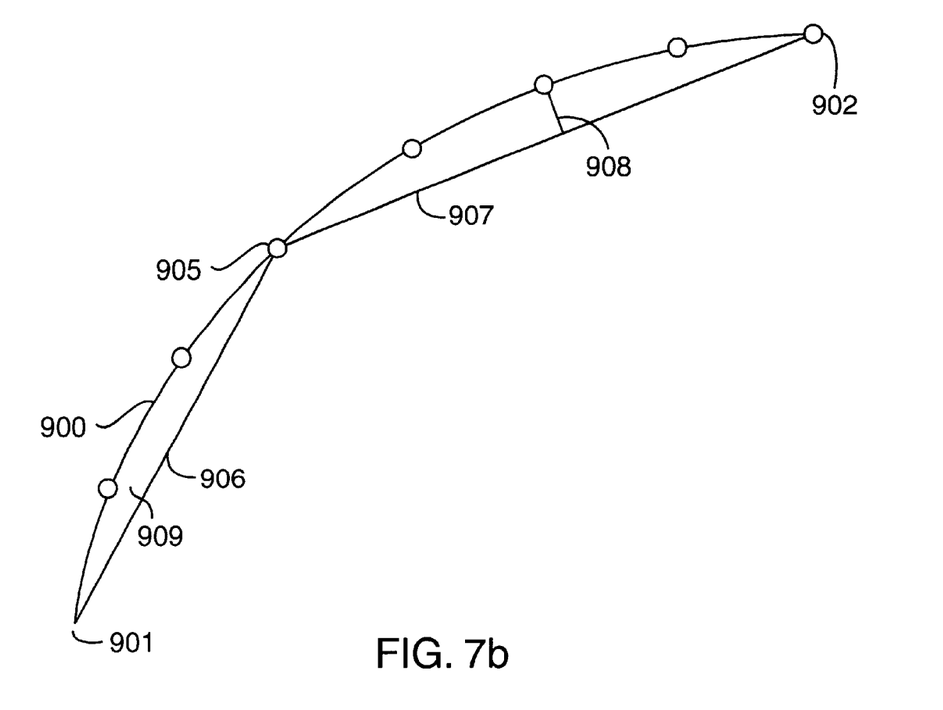
FIG. 7b shows the second iteration of polygonal sampling on a line segment.

Referring now to FIG. 7, in detail, the polygonalisation algorithm approximates the curve 900 delimited by the two knot points 901 and 902 by a series of straight line segments such that no segment is longer than d and the maximum deviation of each sample point is less than $\tau$ from the nearest straight line segment. It does this by recursively dividing the segment until the criteria are met as shown in FIG. 7.

Each segment of ink to resample (900 in FIG. 7) is processed. Initially this will be the segment 903 between two successive knot points 901 and 902. The core of the resampling process goes as follows:

1. Assume a straight line segment 903 between points 901 and 902.
2. Locate the point at maximum distance (904) from line 903, this point 905 in FIG. 7a. To do this efficiently, exploit the fact that almost all segments between knots are simple convex curves. The search starts at the middle sample between 901 and 902 and hill climbs to a point of local (rather than global) maximum deviation. The deviation itself is calculated by a fast approximation. If the line 903 has gradient m and point 901 is placed at (0,0) then the length (l) of line 904 is given by:

$$l = |y - mx|/h$$

where (using a Chebyshev approximation):

$$h = \sqrt{1+m^2} \approx a + b|m| \quad \begin{cases} a = 0.96, \ b = 0.4 & |m| \leq 1 \\ a = 0.4, \ b = 0.96 & |m| > 1 \end{cases} \quad \text{eq. (2)}$$

Thus, the search step can calculate h using small integer arithmetic. Furthermore, h is independent of the point being tested so that it can be calculated once outside the inner loop of the search.

3. If the length (1) of line 904>τ then split the segment 903 at point 905 as shown in FIG. 7b and recursively polygonalise line segments 906 and 907.

4. If the deviation is within limits then check the length of 903. If it is less than d then exit. Otherwise set 905 as the mid point between and recursively polygonalise line segments 906 and 907. In this case, point 905 is normally chosen to be the middle sample point, however in very high speed writing it may be possible for there to be no sample point between 901 and 902 in which case a new interpolation point mid-way between 901 and 902 is synthesised.

An alternative to polygonal resampling is equidistant resampling, i.e. place samples at regular distances along the curve between successive knot points. This is computationally cheaper and improves the ability to use sample prediction in the coding stage, thus reducing the code size per resampled point. However, early experiments show that equidistant resampling achieves very little data reduction without introducing unacceptable distortions and the gain in coding efficiency fails to offset this loss of resampling efficiency.

As described during the discussion of FIG. 1 above, the original ink is represented at spuriously high resolution. An eight fold reduction in resolution (to 125 dpi) is acceptable for the purposes of screen rendering since only the end points of straight-line (or curve) segments are represented at this resolution. The line (or curve) segments themselves can be rendered at the full resolution of the display device. For typical handwriting sizes, storing the resampled points at 125 dpi results in little distortion. Lower resolutions introduce detectable distortions but even reduction to 60 dpi has surprisingly little effect on legibility. In the preferred embodiment, rescaling is accomplished by the crude method of discarding the lowest few (2–4) bits of the coordinate values.

Figure 8:
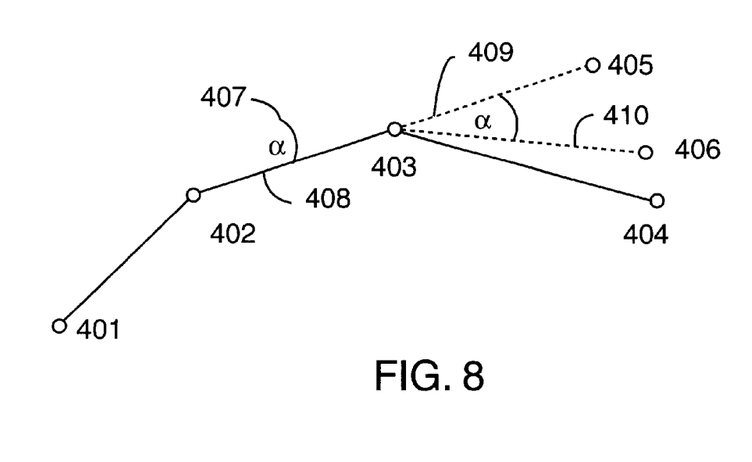
FIG. 8 illustrates the possible curve prediction models.

The prediction/delta coding step 104 of FIG. 1 replaces the (rescaled) absolute coordinate values of the resampled points by a combination of a curve model and a series of small error values. Early experiments with several curve models (Bezier splines, cubic splines, conic sections, Chebyshev and Legendre polynomials) showed that a good fit to the data was possible but the cost of representing curve parameters was comparable to that required to code simple delta samples. First, an attempt was made to code the polygonal sample values using some sort of predictive scheme. The general formulation is illustrated in FIG. 8.

Several alternative models are possible:

1. No prediction. Store the initial location $\underline{s}_0$ and then a series of delta values ($c_i$) each pair of subsequent points: $\underline{c}_i = \underline{s}_i - \underline{s}_{i-1}$. The combination of the d limit in the resampling step and the rescaling step ensures that these delta values have a small fixed bound (typically ±7 or ±15 depending on parameter settings).

2. Predict the next sample point by linear extrapolation $\underline{p}_{i+1} = \underline{s}_i + (\underline{s}_i - \underline{s}_{i-1})$ and then code the error between the predicted point and the actual point $\underline{c}_i = \underline{s}_i - \underline{p}_i$. This will produce small code values when the points lie on a shallow curve but can produce high codes when the curve passes a knot point. In FIG. 8, point 404 is the next point to which the model is attempting to predict. The vector (409) from point 403 to point 405 is a replication of the previous vector 408. The model encodes the error between the predicted point 405 and the actual point 404.

3. Predict the next sample point by assuming the curve is a circle so that $\underline{p}_{i+1} = \underline{s}_i + R(\alpha)(\underline{s}_i - \underline{s}_{i-1})$ where $R(\alpha)$ is the rotation matrix for α, and then code the error between the predicted point and the actual point. As shown in FIG. 8, the predicted point 406 is created by forming a line 410 that is the same angle (α) from the previous extended vector 409, as the angle (α) created between the previous vector 408 and the next to last extended vector 407. The model encodes the error between the predicted point 406 and the actual point 404.

4. Other linear or non-linear modelling schemes, such as the maximum entropy model could be used.

Preliminary experiments showed that at fine sampling grids the approximations in (2) and (3) are valid and generate reduced error code sizes. However, as the sampling density decreases these become poor approximation and simple delta coding (option 1) is more effective. Given the stated requirement for high compression ratios the preferred embodiment uses delta coding, option (1).

The previous stages produce a series of small delta values between pairs of successive resampled points. These deltas have fixed upper bounds. In the preferred embodiment, the deltas are stored directly in packed 4–6 bit integers. One skilled in the art will know that several alternative encoding techniques are possible. The distribution of delta values is not particularly suited to Huffman coding but Arithmetic Coding is applicable. An experiment using arithmetic coding suggests that a further 10% reduction in storage cost could be achieved through this method by using either a fixed or an adaptive statistical model, though at increased decompression cost.

Figure 9:
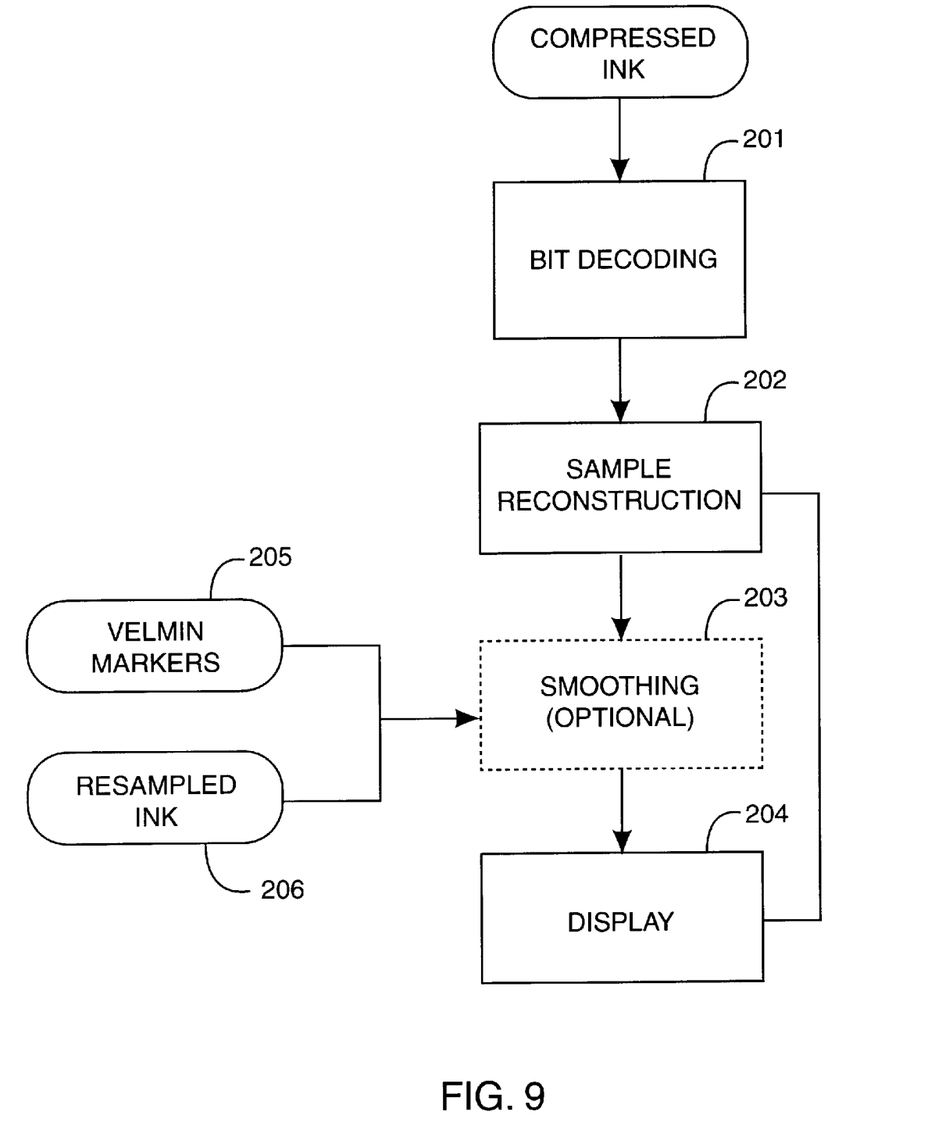
FIG. 9 is a high level flow chart showing the logical operation of the decompression part of the preferred embodiment of the present invention.

Before the compressed data can be used, it must be decompressed. While the above has described the compression process, discussion of the decompression process will follow. Referring now to FIG. 9, for decompression, inverting the bit-packing 201 and delta coding 202 to regenerate the resampled points is straight forward. This reconstructed ink may then be rendered 204 in the usual way by drawing straight line segments between the sample points. However, since it is known that the handwriting curves between knot points are smooth, the ink can be smoothed 203. Numerous methods of smoothing the ink are possible, for example, by using curve segments between each point. Alternatively, the process can interpolate the ink to increase the number of line segments to approximate a smooth curve.

In order to keep the decompression algorithm stand-alone and not rely on a specialised ink rendering system, the latter approach of generating additional interpolation points between the decompressed sample points was chosen. Preliminary experiments showed that interpolating the polygonal segments using cubic splines produces good legibility.

To avoid the interpolation process smoothing off cusps the spline is broken at cusp points. For those systems that also transmit velmin markers 205 as part of the compressed ink, they can use the markers directly to indicate the spline break points. In order to produce a fully stand-alone implementation, the smoothing process has a separate cusp detection stage.

Figure 10:
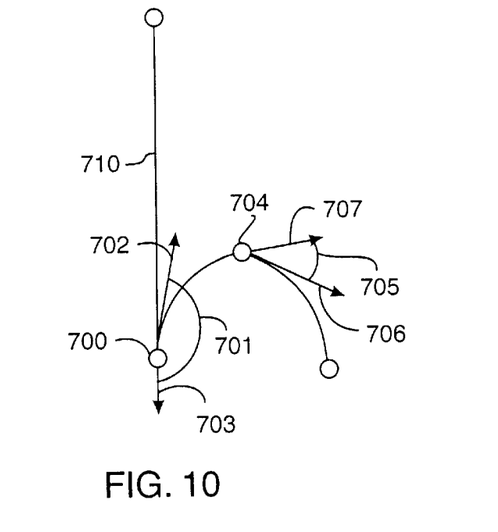
FIG. 10 is an example of a handwritten character that includes a cusp as would be detected by the decompression process.

Cusp detection could be done as in FIG. 3. However, for the purposes of decompression, only those cusps with a high degree of curvature are needed. In the preferred embodiment, the cusp detector labels, as a cusp, any point for which the exit segment angle differs from the entry segment angle by more than 90°. This test is performed cheaply by testing the sign of the dot product of the two vectors. Referring to FIG. 10 shows that given ink 710, there are knot points at 700 and 704, among others. The transition at point 700 should not be smoothed, while the transition at point 704 should be. By checking the angle between the two line segments associated with a point, the smoothing process can determine when to break a line. At point 700, the angle 701 between the tangent 703 to the entering segment and the tangent 702 to the exiting segment is greater than 90°, thus identifying point 700 as a cusp point. Contrast that to the angle 705 between the tangent 707 to the entering segment and the tangent 706 to exiting segment at point 704. Thus, point 704 will not be marked as a cusp and therefore may be smoothed. It should be noted that the above example uses 90° as the test, however, one skilled in the art will understand, after having read the above, that the value of 90° is not critical and may be varied according to system requirements.

Figure 11A:
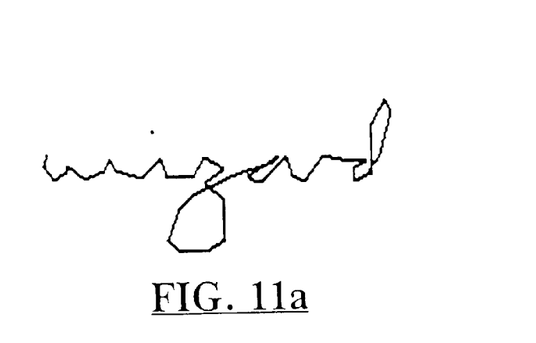
FIG. 11a shows the result of using the highest level of compression of a handwritten word followed by decompression with no additional interpolation.
Figure 11B:
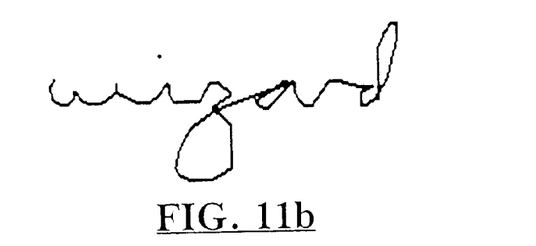
FIG. 11b shows the result of FIG. 11a with one point of interpolation per segment.
Figure 11C:
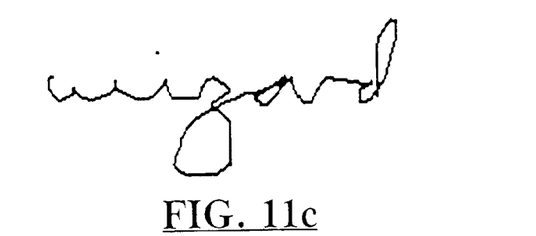
FIG. 11c shows the result of FIG. 11a with three points of interpolation per segment.

With the cusps marked, the interpolation process can begin. A full spline interpolation process is relatively cheap but is overkill for the normal display resolutions in general use. A specialised version of the spline interpolator which generates just one interpolation point between each pair of reconstructed sample points is provided as the default setting in the preferred embodiment. To illustrate this point, FIG. 11 shows the effect of differing amounts of interpolation at the highest compression setting. FIG. 11a shows the ink of FIG. 5 after it has been compressed at the highest compression setting without any smoothing. FIG. 11b shows the result of using the above described spline interpolation to produce an additional point per segment. Finally, FIG. 11c shows the result of generating three additional points per segment.

If a second-order spline is used to represent each segment pair then the curve between successive sample points can be described as a blend between two overlapping second-order splines. Blending, using Legendre polynomials, leads to a cubic spline equation for each sample point:

$$P(t) = P_i + \frac{(P_{i+1} - P_{i-1})}{2}t + \frac{(-P_{i+2} + 4P_{i+1} - 5P_i + 2P_{i-1})}{2}t^2 + \frac{(P_{i+2} - 3P_{i+1} + 3P_i - P_{i-1})}{2}t^3 \quad \text{eq. (3)}$$

together with similar equations for the starting and end points.

For the special case of interpolating a single point between each pair of reconstructed sample points, the algorithm is then:

1. Mark first sample point as the start of a smooth segment, $P_s$.
2. Search sample points $P_i$ until reach the end of the stroke or find a cusp point defined by the dot product test ($\underline{P}_{i+1} - \underline{P}_i) \cdot (\underline{P}_i - \underline{P}_{i-1}) < 0$, mark this as the end of the smooth segment, $P_c$.
3. Generate interpolation points between each pair of samples in the interval using the equations:

$$\underline{P}_{s+0.5} = (3\underline{P}_s + 6\underline{P}_{s+1} - \underline{P}_{s+2})/8$$

$$\underline{P}_{i+0.5} = (-\underline{P}_{i-1} + 9\underline{P}_i + 9\underline{P}_{i+1} - \underline{P}_{i-2})/16$$

$$\underline{P}_{c-0.5} = (-\underline{P}_{c-2} + 6\underline{P}_{c-1} + \underline{P}_c)/8$$

4. If $P_c$ is the last sample in the stroke, exit, otherwise make it $P_s$ and go to step 2.

For the general case of interpolating more than one point between each sample pair, step 3 is replaced by the full cubic equations. In practice, standard difference equation techniques can be used to compute the cubic equations without using any multiplications in the inner loop.

The preferred embodiment is completely stand-alone and does not rely on the use of a front end or a specialised ink rendering system. The compression process uses the x/y extrema knot detector, the fast polygonal resampler and bit-packing (rather than arithmetic coding). The decompression process optionally runs the spline interpolation step to either double or quadruple the reconstructed sample density.

As a 16 bit windows library, the code size is 7 kB for compression/decompression plus 3 kB for interpolation. Average compression times are 6 ms per handwritten word on a Windows 486/50 platform. Average word decompression times are 1.4 ms per word and 2.4 ms if interpolation is switched on.

The various compression parameters may be changed to create numerous "compression" levels. The preferred embodiment provides six compression levels ranging from 0 (near loss-less) to 5 (maximally aggressive, some loss of fidelity). The parameter values used are shown in table 1.

The main effects on the compression results are determined by the writing style. Small, cursive writing is more compressible and more susceptible to distortion than large, print writing styles. The main compression measurements were done using high resolution data from two authors which fall near each end of this spectrum of writing style. For each author three test sentences (40 words in all) were used and the results averaged across the word samples. In all cases the distortions at the high compression levels were subjectively acceptable. Table 1 shows the compression achieved on this test data.

TABLE 1

| Level | τ | d | No. bits dropped in rescaling | Compression for Small/cursive writing | Compression for Large/printed writing |
|---|---|---|---|---|---|
| 0 | 2 | 56 | 2 | 12% | 18% |
| 1 | 5 | 56 | 3 | 9% | 14% |
| 2 | 5 | 120 | 3 | 8% | 12% |
| 3 | 8 | 120 | 3 | 7% | 11% |
| 4 | 5 | 112 | 4 | 7% | 10% |
| 5 | 8 | 112 | 4 | 6% | 9% |

Figure 12:
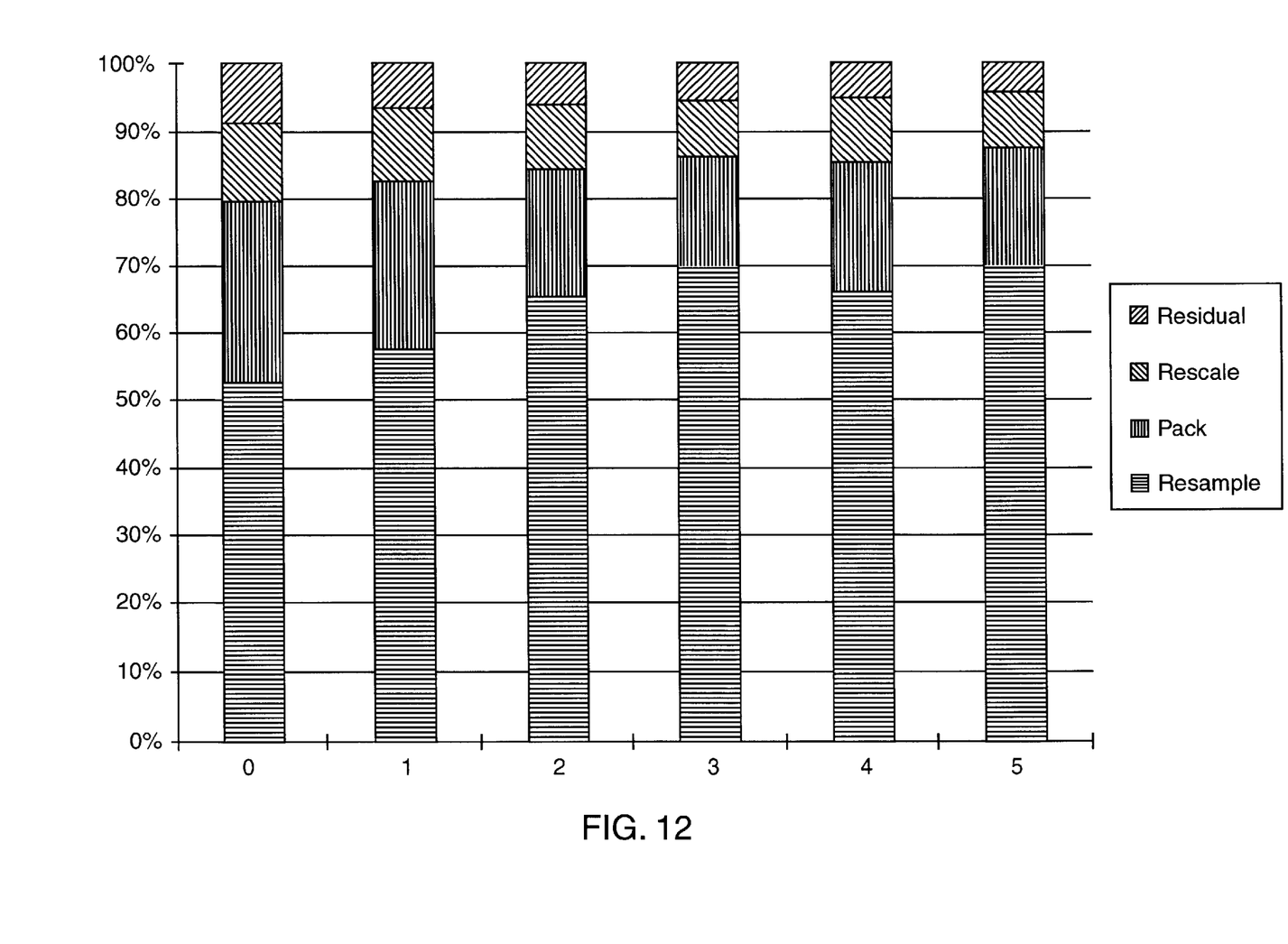
FIG. 12 illustrates the distribution of space savings for one data example at each level of compression.

The chart in FIG. 12 shows what fraction of the final compression is attributable to each of the stages (resampling, rescaling and bit packing) for the example handwritten word from FIG. 5.

As an illustration of the subjective results of compression, FIGS. 13a–13g along with Table 2 shows the results of compressing and decompressing an example word at all six compression levels.

TABLE 2

Figure 13A:
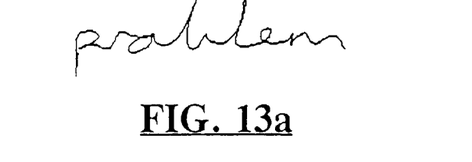
FIGS. 13a–13g illustrates the results of using the preferred embodiment on a handwritten word along with the amount of savings for each level of compression.
Figure 13B:
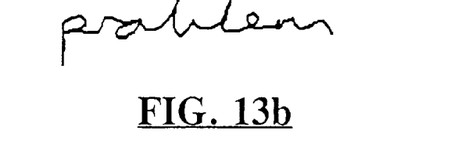
Figure 13C:
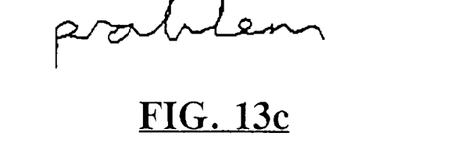
Figure 13D:
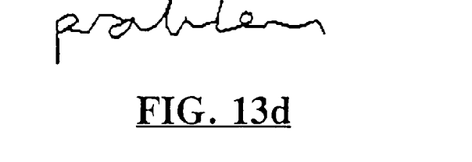

| FIG. | Compression Level | Size | Percent of Original |
|---|---|---|---|
| FIG. 13a | Original | 1156 | 100% |
| FIG. 13b | 0 | 115 | 9% |
| FIG. 13c | 1 | 83 | 7% |
| FIG. 13d | 2 | 69 | 5% |

TABLE 2-continued

Figure 13E:
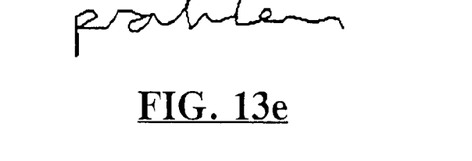
Figure 13F:
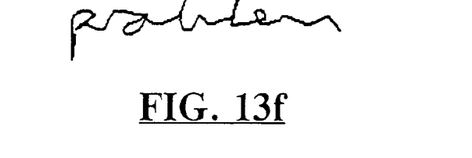
Figure 13G:
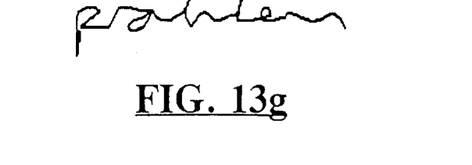

| FIG. | Compression Level | Size | Percent of Original |
|---|---|---|---|
| FIG. 13e | 3 | 59 | 5% |
| FIG. 13f | 4 | 57 | 4% |
| FIG. 13g | 5 | 49 | 4% |

Several avenues for further improvement to these compression systems remain open as future opportunities:

1. For application where computation power is not quite so limited a better final coding stage than simple bit-packing could be used. Experiments with the arithmetic coder suggest than at least a further 10% compression would be achieved this way.
2. A spatial low pass filter could be used before downsampling to avoid aliasing effects. Improvements to this step would have the greatest impact on fidelity of the lossy coder and would not affect the decompression time.
3. The attempts to use predictive coding were not successful for the high compression settings. However, the same regularity in the data could be exploited by using forward-backward coding and using interpolation between alternate pairs of samples rather than extrapolation. Preliminary experiments suggest that up to 10% further savings could be achieved here.

Although the preferred embodiment of the invention has been illustrated, and that form described, it is readily apparent to those skilled in the art that various modifications may be made therein without departing from the spirit of the invention or from the scope of the appended claims.

What is claimed is:

1. A method of compressing the size of a digital representation of handwriting comprising the steps of:
    forming a digital representation of the handwriting by digitizing the handwriting as sequences of coordinate pairs representing traces of strokes of the handwriting having negligible width;
    detecting knot points in said digital representation, said knot points being at local extrema or regions of high curvature of said handwriting;
    identifying each digital representation connecting two knot points and not containing an intermediate knot point as a digital representation segment; and
    resampling each said digital representation segment by polygonal approximation into a variable number of line segments connecting said knot points to create resampled data;
    wherein the numbers and position of line segments created to polygonally approximate each digital representation segment between adjacent ones of said knot points is determined by static parameters of said digital representation segment independent of velocity information.

2. A method according to claim 1 comprising detecting knot points by detecting local extrema in said digital representation.

3. A method according to claim 1 comprising detecting knot points by detecting local velocity minima in said digital representation.

4. A method according to claim 1, further comprising the steps of:
    low pass filtering said digital representation prior to locating said knot points;
    removing artifacts produced by said step of locating;
    rescaling said resampled data to create rescaled data;
    coding said rescaled data to create coded data; and
    packing said coded data to create packed data.

5. A method according to claim 4 wherein said step of coding comprises the steps of:
    predicting the location of a next point on said digital representation and
    encoding the difference between said predicted location of said next point and an actual location of said next point.

6. A method of decompressing a digital representation of handwriting compressed by a method according to claim 4, comprising the steps of:
    unpacking said packed data to derive said coded data;
    decoding said coded data to derive decoded data; and
    connecting individual points within said decoded data by a straight line.

7. A method according to claim 6 wherein said step of decoding comprises the steps of:
    identifying cusps in said decoded data, said cusps being at points of high curvature; and
    deriving an interpolation point between each pair of points along said decoded data between said cusps.

8. A method according to claim 7 wherein said step of deriving comprises the step of using spline smoothing (eq. 3) to find said interpolation points.

9. A method according to claim 7 wherein a cusp is a point for which the exit segment subtends an obtuse angle to the entry segment.

10. A method according to claim 1 wherein said polygonal approximation is based on locating, on a segment of the digital representation defined between first and second points, an intermediate point maximally distant from a straight line between the first and second points, and wherein said line segments are less than a predetermined length.

11. A method according to claim 10 comprising detecting knot points by detecting local extrema in said digital representation.

12. A method according to claim 10 comprising detecting knot points by detecting local velocity minima in said digital representation.

13. A method according to claim 10, further comprising the steps of:
    low pass filtering said digital representation prior to locating said knot points;
    removing artifacts produced by said step of locating;
    rescaling said resampled data to create rescaled data;
    coding said rescaled data to create coded data; and
    packing said coded data to create packed data.

14. A method according to claim 13 wherein said step of coding comprises steps of:
    predicting a location of a next point on said digital representation; and
    encoding a difference between said predicted location of said next point and an actual location of said next point.

15. A method of compressing the size of a digital representation of handwriting comprising the steps of:
    detecting knot points in said digital representation, said knot points being at regions of high curvature of said handwriting; and
    resampling said digital representation by polygonal approximation into a variable number of line segments between adjacent ones of said knot points to create resampled data;

wherein said step of resampling by polygonal approximation comprises substeps of:

defining a straight line from a first point along a portion of said digital representation to a second point along said portion of said digital representation;

locating a third point along a portion of said digital representation between said first point and said second point, said third point being a maximum distance from said straight line;

if said maximum distance is greater than a limit value, then replacing said straight line with a first straight line from said first point to said third point and a second straight line from said third point to said second point;

if said maximum distance is less than said limit value, then:

if said straight line is shorter than a maximum length, then replacing said portion of said digital representation between said first point and said second point with said straight line; and if said straight line is loner than said maximum length, then replacing said straight line with a third straight line from said first point to a fourth point and a fourth straight line from said fourth point to said second point, said fourth point being located on said portion of said digital representation between said first point and said second point.

16. A method according to claim 15 wherein if said straight line has been replaced then the replacement straight lines are new straight lines which have each been defined between a respective first endpoint and second endpoint located on the digital representation, and said step of polygonal resampling comprises the further substeps, for each new straight line, of:

locating an intermediate point along a portion of the digital representation between the first endpoint and the second endpoint, said intermediate point being a new maximum distance from the new straight line; and if said new maximum distance is more than said limit value, then replacing the new straight line with a first further straight line between the first endpoint and the intermediate point and a second further straight line between the intermediate point and the second endpoint;

if said new maximum distance is less than said limit value, then:

if said new straight line is shorter than said maximum length, then replacing said portion of said digital representation between the first endpoint and the second endpoint with said new straight line; and if said new straight line is loner than said maximum length, then replacing said new straight line with a third further straight line from said first end point to a fourth endpoint and a fourth further straight line from said fourth endpoint to said second endpoint, said fourth endpoint being located on said portion of said digital representation between said first endpoint and said second endpoint;

wherein these substeps are repeated for each further straight line generated until all straight lines in the resampled representation are shorter than the maximum length and are not separated from any intermediate point in the section of the digital representation bounded by endpoints of the further straight line by more than said limit value.

17. A method according to claim 15 comprising detecting knot points by detecting local velocity minima in said digital representation.

18. A method of compressing the size of a digital representation of handwriting comprising the steps of:

forming a digital representation of the handwriting by digitizing the handwriting as sequences of coordinate pairs representing traces of strokes of the handwriting having negligible width;

detecting knot points in said digital representation, locations of said knot points being based upon static spatial parameters of said handwriting representation irrespective of handwriting velocity information;

defining each pair of adjacent knot points and points of said digital representation which are located therebetween as a digital representation segment; and resampling each said digital representation segment by polygonal approximation into a variable number of line segments to create resampled data.

19. A method according to claim 18 wherein the step of resampling by polygonal approximation further comprises:

defining a first straight line for polygonal approximation between a first knot point and an adjacent second knot point;

if the first straight line is longer than a maximum length l, or if a point on a first digital representation segment between the first and second knot points is farther than a maximum distance d from the first straight line, then replacing said first straight line by second and third straight lines for polygonal approximation, said second straight line being between the first knot point and a third point located on said digital representation segment and said third straight line being between said third point and said second knot point.

20. A method according to claim 18 wherein said polygonal approximation is based on locating, on a segment of the digital representation defined between first and second points, an intermediate point maximally distant from a straight line between the first and second points.

21. The method of claim 18 comprising the further steps of:

filtering the digital representation before locating the knot points;

removing artifacts produced by said step of locating;

rescaling said resampled data to create rescaled data;

coding said rescaled data to create coded data; and packing said coded data to create packed data.

* * * * *